(12) United States Patent
Tarkington

(10) Patent No.: US 6,493,921 B1
(45) Date of Patent: Dec. 17, 2002

(54) METHOD OF CONVEYING ARTICLES FROM A TRANSPORT VEHICLE

(76) Inventor: William Tarkington, 9817 Delaware Pl., Highland, IN (US) 46322

( * ) Notice: Subject to any disclaimer, the term of this patent is extended or adjusted under 35 U.S.C. 154(b) by 25 days.

(21) Appl. No.: 09/645,193

(22) Filed: Aug. 24, 2000

Related U.S. Application Data

(63) Continuation-in-part of application No. 08/678,747, filed on Jul. 11, 1996.

(51) Int. Cl.[7] .............................. B23P 11/00; B65G 67/24
(52) U.S. Cl. ..................... 29/525.01; 414/391; 414/397; 104/126; 248/243
(58) Field of Search .................. 29/525.01, 525.11; 414/391, 397, 572, 585, 390, 573; 104/126, 125; 248/241, 243; 182/179.1; 193/4–5

(56) References Cited

U.S. PATENT DOCUMENTS

| | | | | |
|---|---|---|---|---|
| 635,177 A | * | 10/1899 | McCabe | 198/833 |
| 1,158,305 A | * | 10/1915 | Schmeling | 108/147.19 |
| 1,268,418 A | * | 6/1918 | Anderson | 104/126 |
| 2,249,941 A | * | 7/1941 | Burton | 104/125 |
| 3,104,009 A | * | 9/1963 | Ramer | 198/830 |
| 3,286,651 A | * | 11/1966 | Dahl, Jr. | 104/118 |
| 3,374,877 A | * | 3/1969 | Kornylak | 198/791 |
| 3,455,344 A | * | 7/1969 | Sowder | 414/397 |
| 3,825,131 A | * | 7/1974 | Batson | 414/391 |
| 3,857,473 A | * | 12/1974 | Kornylak | 198/789 |
| 4,026,079 A | * | 5/1977 | Morris | 182/180.1 |
| 4,221,170 A | * | 9/1980 | Koudelka | 104/120 |
| 4,665,830 A | * | 5/1987 | Anderson et al. | 104/124 |
| 4,708,048 A | * | 11/1987 | Brown et al. | 104/126 |
| 4,715,488 A | * | 12/1987 | Hewitt et al. | 193/35 R |
| 5,385,215 A | * | 1/1995 | Williams et al. | 182/113 |

OTHER PUBLICATIONS

Printout from www.klemmfix.com, three pages, dated Jan. 15, 2002.*

* cited by examiner

*Primary Examiner*—A. L. Wellington
*Assistant Examiner*—Erica E. Cadugan
(74) *Attorney, Agent, or Firm*—Wood, Phillips, Katz, Clark & Mortimer

(57) ABSTRACT

A method of conveying articles on a transport vehicle from a first location to a second location spaced from the transport vehicle including the step of providing a conveyor system comprising (a) a cart for supporting an article, (b) mechanism for guiding the cart along a predetermined path between the first location and the second location, and (c) mechanism for supporting at least part of the guiding mechanism on a subjacent surface. The method further includes the step of assembling at least part of at least one of the guiding mechanism and the supporting mechanism on site. The method also includes the steps of placing the cart on the guiding mechanism, placing an article from the transport vehicle on the cart, translating the cart with the article thereon from the first location to the second location along the predetermined path, and removing the article from the cart at the second location.

28 Claims, 9 Drawing Sheets

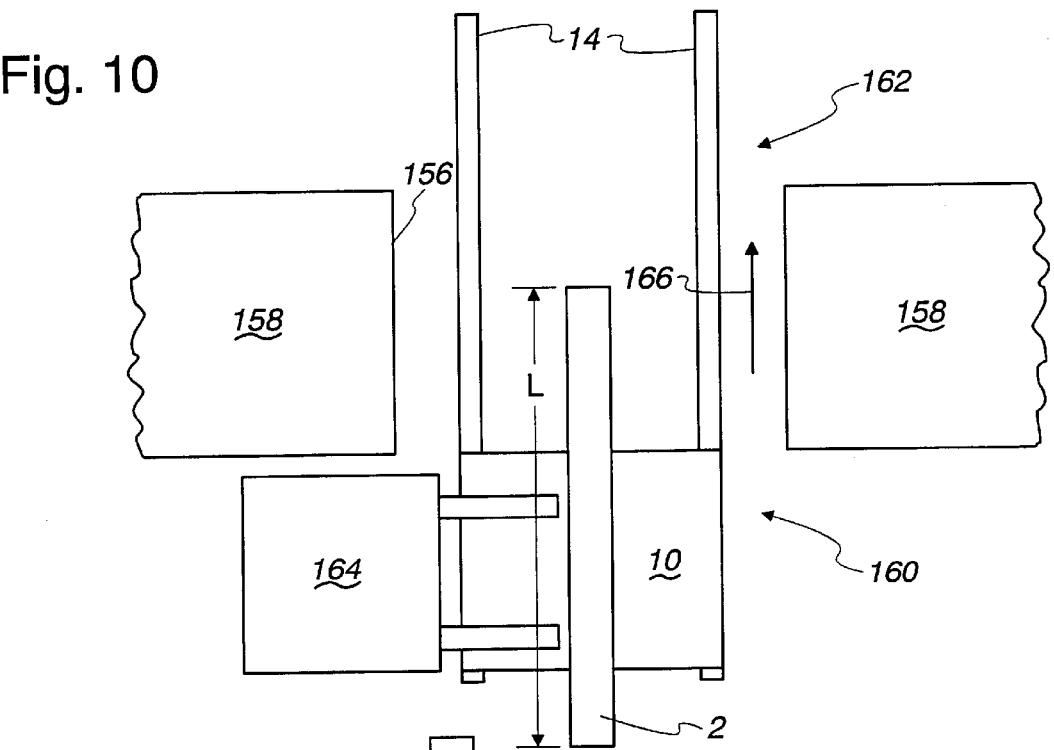
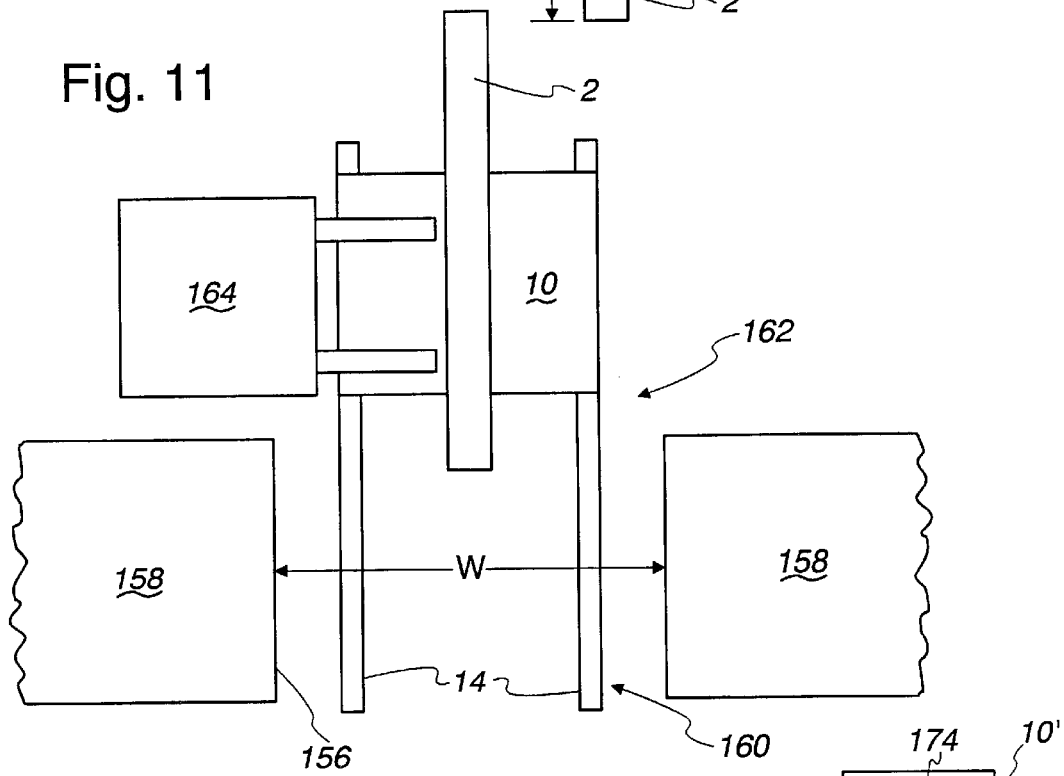
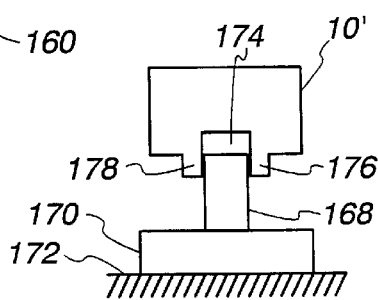

METHOD OF CONVEYING ARTICLES FROM A TRANSPORT VEHICLE

CROSS REFERENCE

This application is a continuation-in-part of my co-pending application Ser. No. 08/678,747, filed Jul. 11, 1996.

BACKGROUND OF THE INVENTION

FIELD OF THE INVENTION

This invention is directed to a system and a method of assembling and using the system for conveying articles from a first location to a second location. In particular, this invention is directed to a system and method for conveying articles along a predetermined path from a first location where the articles are unloaded from a transport vehicle to a second location, as in a warehouse.

BACKGROUND OF THE INVENTION

Unloading articles from a transport vehicle into a warehouse can be a time-consuming, labor-intensive process. The use of fork lifts, the palletization of shipments, and the construction of docks designed to limit the height differential between the floor of the transport vehicle and the floor of the warehouse may have served to reduce the costs associated with unloading transport vehicles in some situations. In other situations, these measures may be of little practical advantage.

For example, during the early stages of construction of a warehouse, it is commonly necessary to unload transport vehicles carrying modular shelving to be installed in the warehouse for the storage of palletized goods. This modular shelving consists of a series of substantially vertical, trussed uprights and a series of substantially horizontal beams disposed at spaced intervals along the uprights to form the shelves on which the palletized goods may be stored. According to the size of the pallets which are to be placed on the horizontal beams for storage, these uprights and beams can be quite wide and long. While the uprights and the beams can be formed into bundles for transport, each of the bundles being secured together using a metal band or strap, the bundles are substantially larger and more unwieldy than the more regularly-shaped palletized loads commonly unloaded from transport vehicles.

Under the construction conditions commonly present at the time when the shelving is to be unloaded, the transport vehicle commonly cannot be brought closer than a remote location ten or twelve feet from the edge of the loading dock. To exacerbate matters, the ground between the transport vehicle is commonly broken terrain, made up of a mixture of sand, gravel and mud.

In those instances where a dock and finished apron exists, and the transport vehicle can be brought in close enough to reach the dock edge, the tight spacing of the transport vehicles along the edge of the dock may prevent a fork lift from approaching the bundles in such a way that the fork lift can be used to any significant mechanical advantage. Additionally, the slope of the apron may be such that unloading is further complicated, or that the bundles may have a tendency to slide off of the arms of the fork lift.

As a result, a hodgepodge of unloading techniques have been put into practice in the industry to remove the bundles, of shelving material from the transport vehicles in this environment. For instance, one technique has been to unbundle the materials on or near the transport vehicle and to transport the individual pieces one at a time into the warehouse, using four to six workmen. This technique may be especially time consuming, and typically may not be very cost-effective. Additionally, the technique may expose the workmen unnecessarily to work-related injury.

A common alternative technique under construction conditions is to use all-terrain fork lifts to approach the transport vehicle parked at the remote location at a construction site and remove a bundle from the transport vehicle. With the assistance of two or more workmen to prevent the bundle from becoming separated from the fork lift, the fork lift operator then proceeds to direct the fork lift backwards and forward in small angular increments until a first end of the bundle rests on the upper edge of the dock.

The fork lift operator may then allow a second end of the bundle to come to rest on the ground in the area of broken terrain between the dock and the transport vehicle. The second end can then be elevated using the fork lift (now approaching the bundle from the end instead of the side) a jack, or even manpower, until the first and second ends are essentially level and the bundle is essentially parallel to the floor of the warehouse. To keep the first and second ends leveled, often wedges are inserted between the second end and the ground.

Once the bundle has been raised, the bundle can be moved so that it rests entirely on the floor of the warehouse by pushing or dragging the bundle at the first end using manpower or a fork lift. Alternatively, two fork lifts can be used, one at the first end and moveable along the warehouse floor and one at the second end and moveable along the broken terrain below the dock, to raise the first and second ends of the bundle slighty to allow for a space between the bundle and the floor of the warehouse while the bundle is moved into the warehouse. As a further alternative, the bundle can be raised by passing a chain around the bundle and using a fork lift on the dock to raised the bundle from the ground level to the dock level.

The technique becomes even more complicated when the uprights and beams must be passed through a doorway from the dock into the warehouse. Often, the doorways are not large enough to accommodate the uprights and beams when these materials are in the orientation which is easiest for the fork lifts. As a consequence, the uprights and beams must be manually maneuvered, or jockeyed, through the doorways.

The techniques presently in use in the industry, as outlined above, may have several significant drawbacks. The most immediate drawback may be the cost of conducting the unloading operation. Sizeable capital outlays may need to be made to purchase or rent the forklifts, jacks and supports used to remove the bundles from the transport vehicle, move the bundles to the dock edge, level the bundles at the dock edge, and then move the bundles off the dock edge and into the warehouse. Sizeable labor expense may also be incurred for the services of the at least one, and possibly two or three, skilled fork lift operators and the two or more workmen necessary to unload each bundle from the transport vehicle.

This technique also causes costs which are not directly assignable as costs of the unloading operation, but which may come about as a direct result of doing business using the techniques outlined above. For example, the uprights and the beams are commonly painted prior to shipment and installation. When the bundles of uprights and beams are taken off the transport vehicle, rested along the edge of the dock, and then pushed or pulled along the warehouse floor, a considerable amount of paint may be removed from the uprights and the beams. Additional damage can be caused to the uprights and the beams, not to mention to the structure, when the uprights and beams are dragged through the doorway from the dock into the warehouse.

Even the arms of the fork lift, or the surfaces of the jacks or chains used to raise the materials to dock level, can cause damage to the materials, especially if the bundles become separated from the arms of the fork lift or if the bundles break open. Damage can also be caused by the arms of the forklift to the uprights of the shelving material because the arms are substantially horizontal, while the struts of the uprights in contact with the arms can be at a 30 or 40 degree angle to the horizontal.

Consequently, the uprights and beams may need to be repainted or replaced. If repainted, then the costs of the paint, the freight charges spent shipping the paint, and the man-hours spent painting the uprights and beams should be added to the costs of using this technique. If the uprights or beams must be replaced, then the cost of replacing the uprights or beams, including the associated freight, should be factored into the costs of this technique.

Additionally, given the size and weight of the bundles, and the rather complicated nature of the procedure, it is not uncommon for the workmen and the fork lift operators to become injured. This is especially true if one of the straps which holds the bundle together snaps under the forces caused by dragging or pushing the bundles over the dock edge. The costs of worker injuries, including possible hospitalization and man-hours lost, should thus be added into the overall costs of using this technique.

Additional costs more difficult to quantify in monetary terms may also be incurred by the installer a consequence of using these standard techniques. For example, the damage caused to shelving may create a great deal of customer dissatisfaction as the customer loses opportunities because of the delays in installation caused by the need to repaint or replace damages uprights or beams.

Therefore, there exists a need to develop a system and method for transporting these heavy, unwieldy bundles from the transport vehicle to the warehouse floor for installation, which method should address one or more of the disadvantages outlined above of the present technique for unloading these bundles. Moreover, generally, there exists a need to develop a system and a method for unloading heavy, bulky, clumsy objects from transport vehicles and to transport these objects over broken terrain substantial distances into a warehouse.

SUMMARY OF THE INVENTION

According to an aspect of the present invention, a method of conveying articles on a transport vehicle from a first location to a second location spaced from the transport vehicle including the step of providing a conveyor system comprising (a) a cart for supporting an article, (b) mechanism for guiding the cart along a predetermined path between the first location and the second location, and (c) mechanism for supporting at least part of the guiding mechanism on a subjacent surface. The method further includes the step of assembling at least part of at least one of the guiding mechanism and the supporting mechanism on site. The method also includes the steps of placing the cart on the guiding mechanism, placing an article from the transport vehicle on the cart, translating the cart with the article thereon from the first location to the second location along the predetermined path, and removing the article from the cart at the second location.

Moreover, where the supporting mechanism further includes a plurality of upright support segments and a plurality of trusses, the step of assembling at least part of at least one of the guiding mechanism and supporting mechanism on site may include the steps of placing the support segments at regular intervals along the predetermined path, and connecting the trusses between adjacent support segments. Additionally, the step of connecting the trusses between adjacent support segments may include the step of locking the trusses to the support segment. Where the support segments have a plurality of tabs attached thereto, the trusses have a plurality of couplings thereon, the tabs and the couplings having holes formed therethrough, the step of locking the trusses to the support segments may include the steps of aligning the holes in the tabs with the holes in the couplings, and passing a fastener through the holes.

Moreover, where the support segments have a variable height in a vertical direction, the step of assembling at least part of at least one of the guiding mechanism and supporting mechanism on site may include the step of adjusting the height of the support segments so that there is a decreasing height in a vertical direction of the support segments over a distance at least partially between the first location and the second location.

Moreover, where the supporting mechanism further includes a plurality of support segments and a first and second plurality of trusses, the step of assembling at least part of at least one of the guiding mechanism and supporting mechanism on site may include the steps of placing the support segments at regular intervals in two lines along the predetermined path, connecting the first plurality of trusses between adjacent support segments, both adjacent support segments disposed in one of the two lines along the predetermined path, and connecting the second plurality of trusses between adjacent support segments, one of the support segments connected by the second plurality of trusses disposed in one of the two lines and the other support segments connected by the second plurality of trusses disposed in the other of the two lines.

Moreover, where the guiding mechanism includes a plurality of rail segments, the step of assembling at least part of at least one of the guiding mechanism and supporting mechanism on site may include the steps of placing the rail segments at least partially on the supporting mechanism and along the predetermined path, and joining adjacent rail segments. Additionally, the step of joining adjacent rail segments may include the step of locking adjacent rail segments together. Also, where the rail segments have first and second ends, a first plurality of rail segments having a hole formed through the first and second ends, a second plurality of rail segments with first and second ends having extension plates attached to the first and second ends, and the extension plates extending beyond the first and second ends and having holes formed therethrough, the step of locking adjacent rail segments may include the steps of aligning the holes in the ends of the first plurality of rail segments with the holes in the extension plates formed in the second plurality of rail segments, and placing a fastener through the holes.

Moreover, the step of assembling at least part of at least one of the guiding mechanism and supporting mechanism on site may include the step of assembling the supporting mechanism so that the supporting mechanism is freestanding independently of the transport vehicle.

Moreover, the method may include the step of marking at least a part of the supporting mechanism and guiding mechanism different colors to assist in assembling at least part of at least one of the guiding mechanism and the supporting mechanism on site.

Moreover, the method may include the step of placing visible indications on at least part of the supporting mechanism and guiding mechanism to assist in assembling at least part of at least one of the guiding mechanism and the supporting mechanism on site.

Moreover, the method may further include the step of disassembling the supporting mechanism and the guiding mechanism after the article is removed from the cart.

Moreover, the method may further include the step of locking the cart to the guiding mechanism to prevent the cart from moving in other than the predetermined path. Additionally, where the cart has a wheel with a running surface and a groove formed in the running surface, the guide mechanism including a rail complementary to the groove along the predetermined path, the step of locking the cart to the guiding mechanism to prevent the cart from moving in other than the predetermined path may include the step of fitting the rail into the groove in the wheel of the cart.

Thus, the present invention may provide a system and method for unloading transport vehicles which reduces the costs of such an operation both in terms of monetary outlays and man-hours spent.

The present invention may provide a system and method for unloading transport vehicles which reduces the amount of damage caused to objects unloaded using alternative methods, and consequently reduces the costs of replacing or repairing the objects relative to alternative methods.

The present invention may provide a system and method for unloading transport vehicles which is highly adaptable, and can be adjusted to conform to the surrounding terrain, including broken terrain and sloped terrain.

The present invention may provide a system and method for unloading transport vehicles which is light weight and portable.

The present invention may provide a system and method for unloading transport vehicles which is relatively compact and portable.

The present invention may provide a system and method for unloading transport vehicles which is easy to assembly, both in terms of the tools and the time required for assembly.

The invention is also directed to a method of conveying an article from a first location to a second location. The method includes the steps of providing a conveyor system with a cart and at least one guide rail that has a broken down state and an assembled state. With the conveyor system at a first site in a broken down state, the conveyor system is placed in an assembled state wherein the cart is movable guidingly along the at least one guide rail between the first and second locations. With the cart at the first location, an article is loaded onto the cart. The cart with the article loaded thereon is moved to the second location. At the second location, the article is removed from the cart. After removing the article from the cart, the conveyor system is placed in the broken down state.

The method may further include the step of re-placing the conveyor system into the assembled state after the article is removed from the cart and the conveyor system is placed in the broken down state.

The method may further include the steps of moving the conveyor system from the first site to a second site after the article is removed from the cart and the conveyor system is placed in the broken down state. At the second site, the conveyor system may be re-placed into the assembled state.

The method may include the steps of locating a second article on the cart at a third location with the conveyor system at the second site and with the second article on the cart, guidingly moving the cart from the third location to a fourth location. The second article may be unloaded from the cart at the fourth location.

In one form, with the conveyor system in the broken down state, the at least one rail and cart are separated from each other.

In one form, the at least one rail consists of first and second elongate rails each with a length and spaced from each other in a direction transverse to the length of the first and second elongate rails. The first and second elongate rails are separated from each other and the cart with the conveyor system in the broken down state.

In one form, the elongate rail includes first and second elongate segments and the first and second elongate segments are separated from each other with the conveyor system in the broken down state.

In one form, the conveyor system further includes a support made up of multiple elements which maintain the at least one rail in an elevated position relative to a subjacent support surface with the conveyor system in the assembled state. With the conveyor system in the broken down state, the multiple elements of the support are separated from each other and the cart and the at least one rail.

BRIEF DESCRIPTION OF THE DRAWINGS

FIG. 10 is a fragmentary, schematic, plan view showing a load being placed on a cart on the inventive conveyor system for movement through a wall opening;

FIG. 11 is a view as in FIG. 10 with the cart repositioned so that the load is passed through the wall opening for unloading on the side of the wall opposite from the side on which loading takes place; and FIG. 12 is a schematic, end elevation view of a modified form of conveyor system according to the invention.

DESCRIPTION OF THE PREFERRED EMBODIMENTS

The present invention is for a conveyor system including three major subassemblies: a cart for supporting an article; a mechanism for guiding the cart along a predetermined path between a first location and a second location; and a mechanism for supporting at least part of the guiding mechanism between the first and second locations on a subjacent surface 1. In the preferred embodiment of the present invention, the guiding mechanism and the supporting mechanism are modular. That is to say, the guiding and supporting mechanisms are made up of smaller subunits or segments, which segments are partially or totally interchangeable with other segments of a given type, and can be joined together to create the major subassemblies of the present invention.

Figure 1:
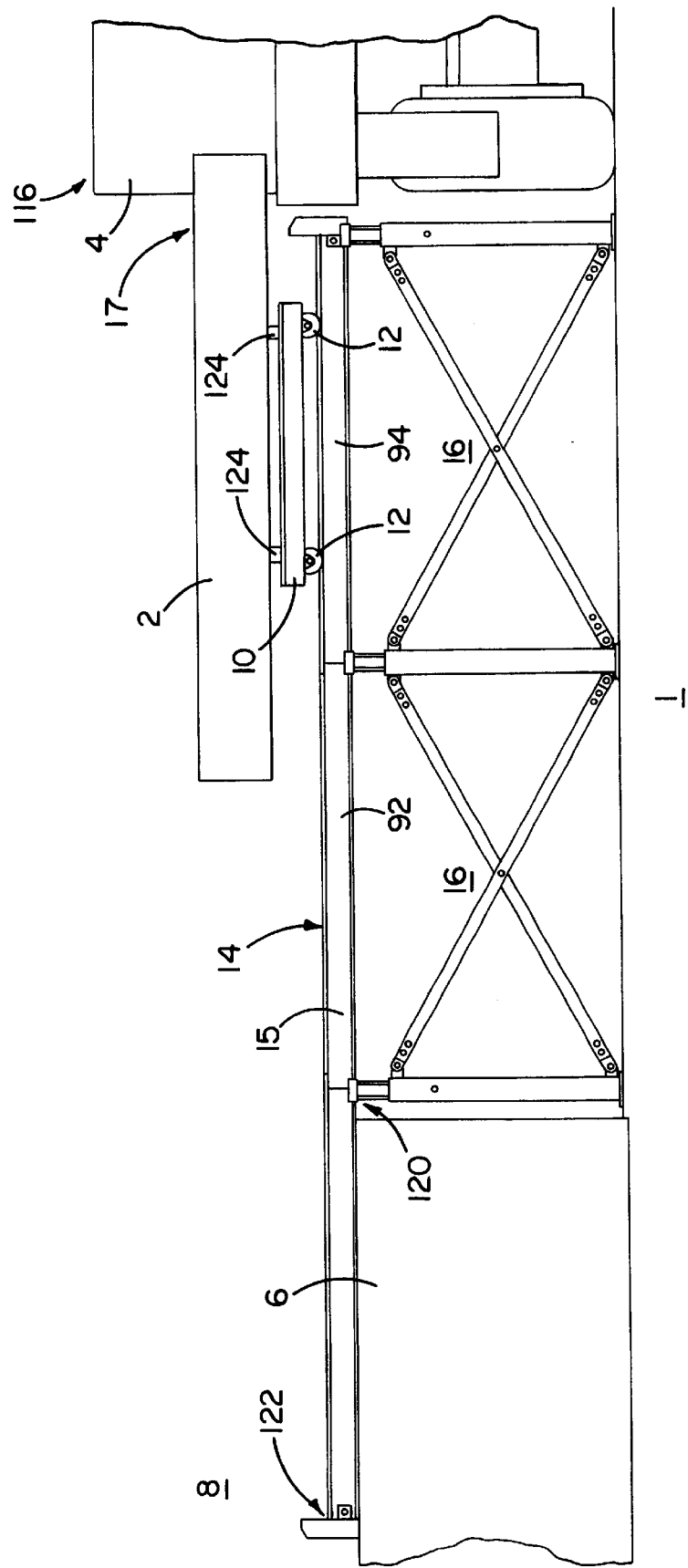
FIG. 1 is a side elevation view of an assembled conveyor system according to the present invention, with the conveyor system shown spanning a distance from a transport vehicle at a first location to a dock and a warehouse at a second location.

An embodiment of the conveyor system according to the present invention is illustrated in its intended environment in FIG. 1. To facilitate the unloading of an article 2 from a transport vehicle 4 to a dock 6 in a warehouse 8, an embodiment of the present invention is shown spanning the distance between the transport vehicle 4 and the dock 6. The conveyor system includes a cart 10 having wheels 12 which run along a set of rails 14. The rails 14 are made up of a plurality of rail segments 15. The rails 14 are supported in part by a plurality of trussed support sections 16, which themselves are disposed on a subjacent surface 1, and in part by the dock 6.

Figure 2:
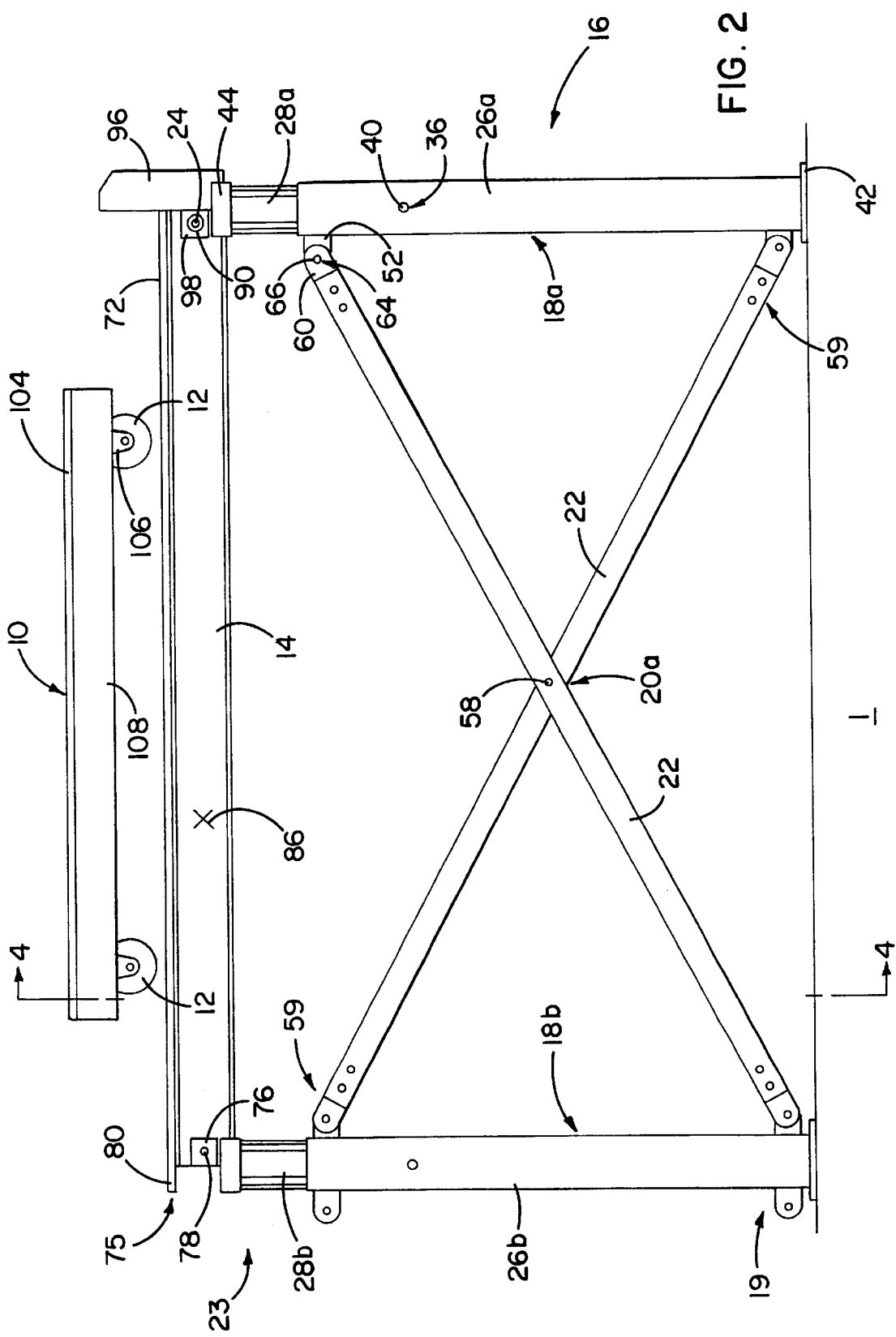
FIG. 2 is an enlarged, side elevation view of a module used to construct the inventive conveyor system with rail segments supported on an uppermost edge of a supporting mechanism and a cart disposed slightly above the rail segments.
Figure 3:
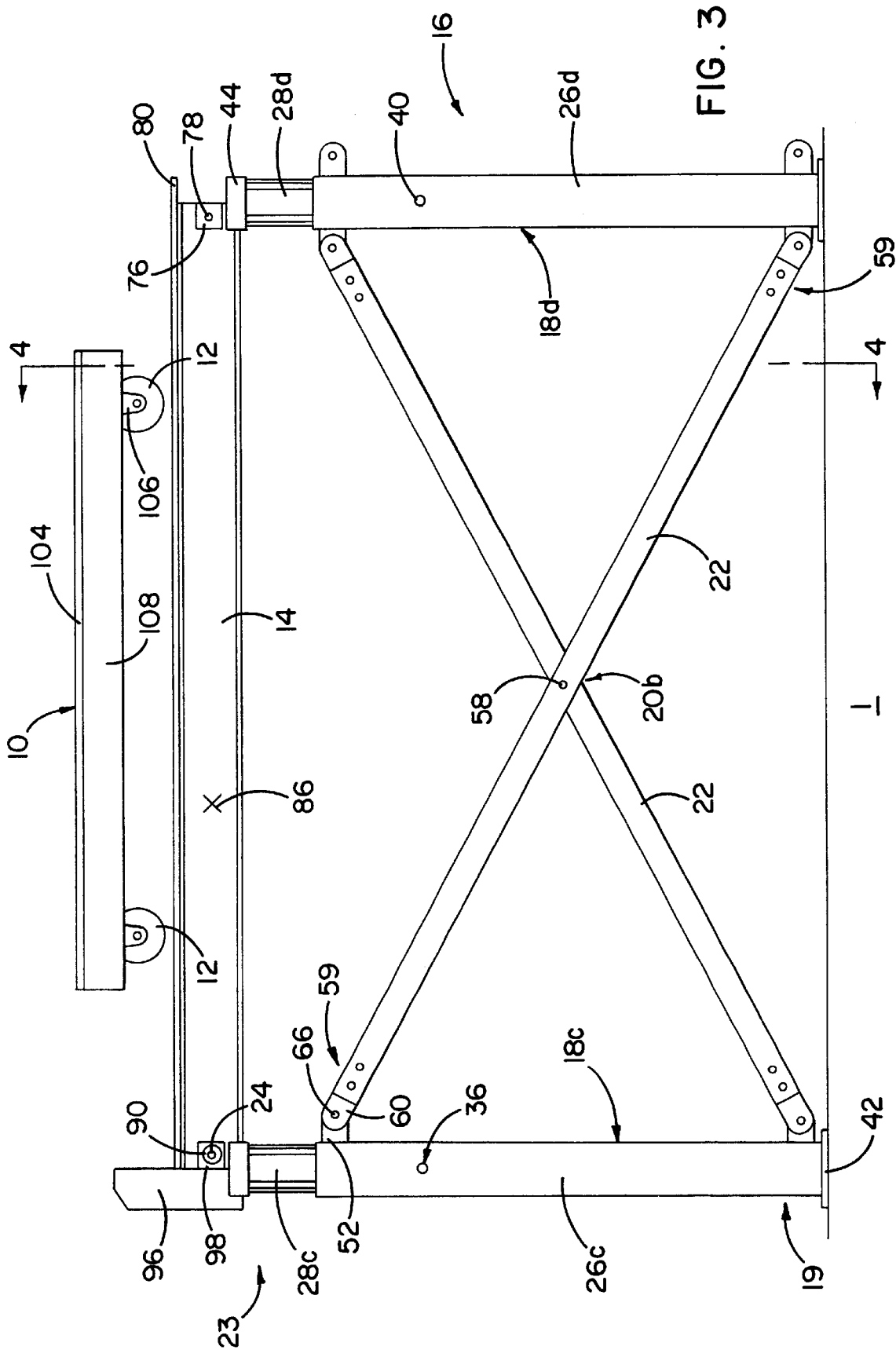
FIG. 3 is a side elevation view of the opposite side of the module shown in FIG. 2.
Figure 4:
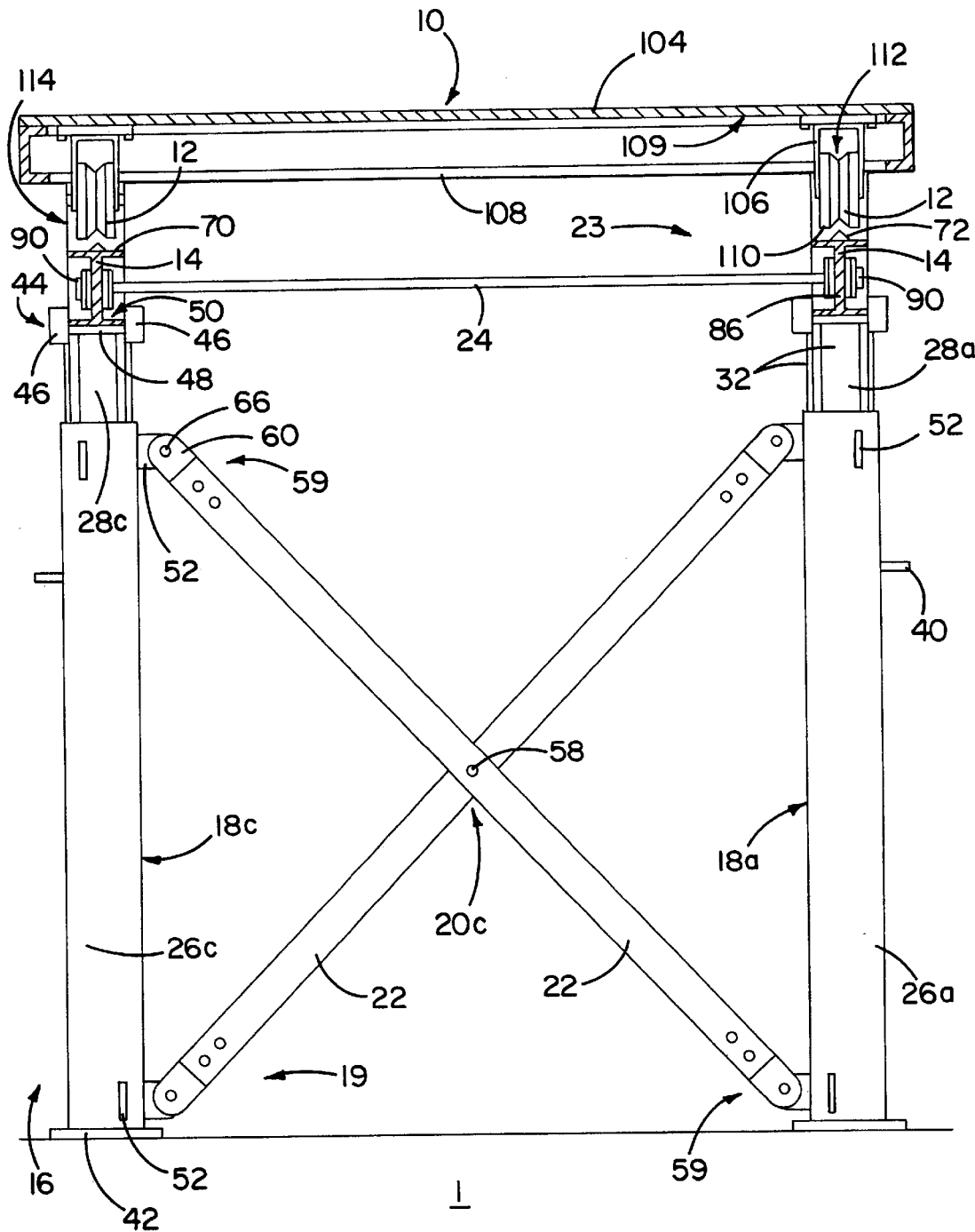
FIG. 4 is an enlarged, cross-sectional view of the module of FIG. 1 taken about line 4—4 in FIGS. 2 and 3 with side trusses on the supporting mechanism removed.

FIGS. 2–4 show in greater detail one of the trussed support sections 16, particularly the trussed support section 16 located adjacent to the transport vehicle 4 at a first end 17 of the conveyor system. The trussed support section 16 is made up of four upright support legs or segments 18a, 18b, 18c and 18d, which bear the rails 14, and four trusses 20 (three of which are shown as 20a, 20b, and 20c in FIGS. 2, 3, and 4, respectively), which rigidify the support sections 16 and prevent the support segments 18 from moving out from under the rails 14. It will be noted with reference to FIG. 1 that adjacent support sections 16 share two support segments 18 and a truss 20.

The support segments 18 are preferably disposed with a first end 19 of the support segments 18 abuttable to the surface 1, which is preferably a level finished surface, but alternatively includes a surface of broken terrain under construction conditions or a sloped finished surface. The support segments 18 are disposed at spaced intervals in two lines along a predetermine path along which the cart 10 will travel.

Adjacent support segments 18 along the same line of support segments 18, as well as adjacent support segments 18 from different lines of support segments 18, are connected with a truss 20. The truss 20 is preferably formed from two intersecting tubular support elements 22. A first truss 20a connects the support segments 18a and 18b (FIG. 1), while a second truss 20b connects the support segments 18c and 18d (FIG. 2), and a third truss connects the support segments 18a and 18c (FIG. 3). A fourth truss, not shown, is connected between the support segments 18b and 18d.

Figure 5A:
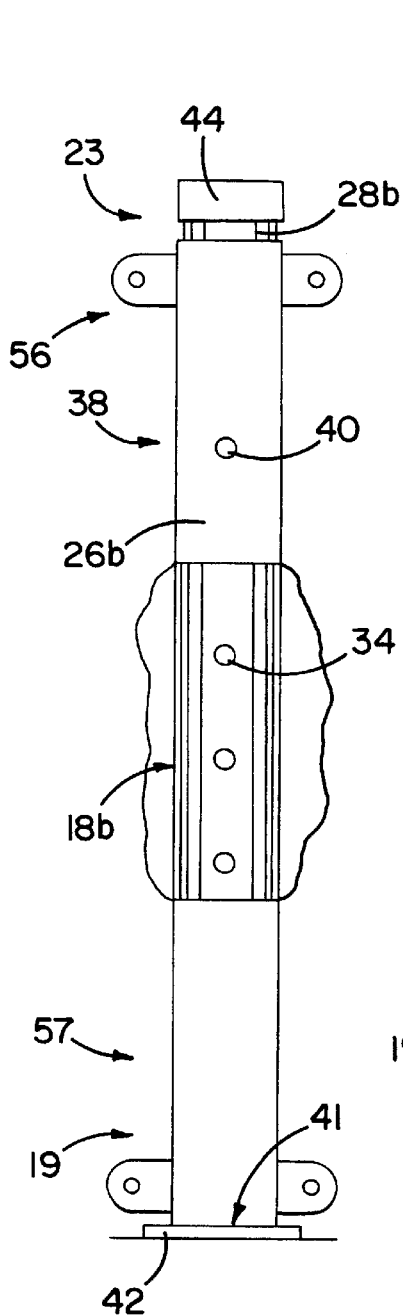
FIGS. 5A–C are enlarged, partial cross-sectional views of a support segment on the supporting mechanism according to an embodiment of the present invention shown with a top holder attached to a moveable section disposed at three different heights in a vertical direction relative to a fixed section of the support segment.
Figure 5B:
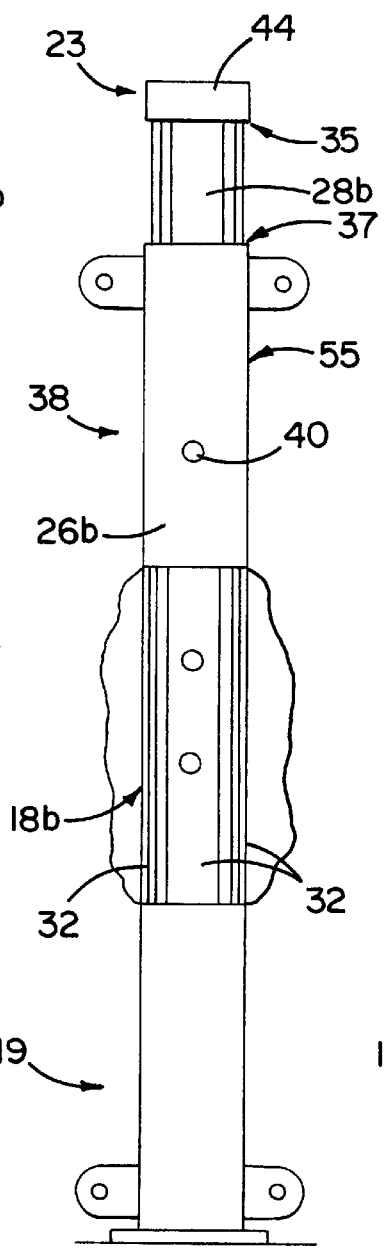
Figure 5C:
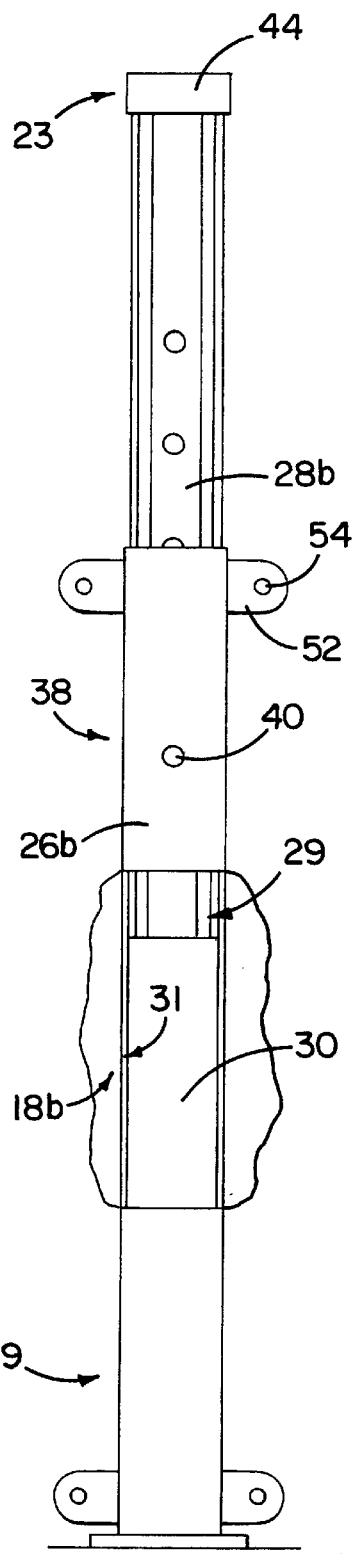

The support segments 18 are constructed with a fixed section 26 and a moveable section 28, as shown in greater detail in FIGS. 5A–C for the support segment 18b. Both the fixed section 26 and the moveable section 28 are preferably fabricated from aluminum tubing having a substantially square cross section and walls 0.25 inches (6.35 mm) thick. As shown in FIG. 5C, the moveable section 28 is disposed within a hollow or cavity 30 in the fixed section 26.

The outer dimensions of the moveable section 28 are selected to provide a minimum of 0.25 inches (6.35 mm) clearance between the outside surface 29 of the tube used to fabricate the moveable section 28 and the inner surface 31 of the tube used to fabricate the fixed section 26 when the moveable section 28 is disposed within the fixed section 26. This clearance between the moveable section 28 and the fixed section 26 is necessary because preferably reinforcing plates or strips 32 of aluminum 0.125 inches (3.18 mm) thick are attached, preferably by welding, to the outside surface 29 of the moveable section 28 to increase the structural rigidity of the moveable section 28.

Along one side of the moveable section 28 are formed a series of five holes 34. The top hole 34 is spaced 4.5 inches (11.43 cm) from the top edge 35 of the moveable section 28, and the four remaining holes are spaced at 2 inch (5.08 cm) intervals thereafter along the vertical dimension of the moveable section 28. The holes 34 extend through the reinforcing plate 32 and the wall of the moveable section 28. A similar hole 36 is formed in the fixed section 26, and extends through the wall of the fixed section 26 approximately 4 inches (10.16 cm) from a top edge 37 of the fixed section 26.

A locking or securing mechanism 38 is formed by disposing a pin 40 through the hole 36 and one of the holes 34 to lock or secure the top edge 35 of the moveable section 28 at a selected vertical distance from the top edge 37 of the fixed section 26. Given the 2 inch (5.08 cm) spacing between the holes 34, the locking mechanism 38 allows for the height of the support segment 18 to be most preferably adjusted in 2 inch (5.08 cm) increments, although larger or smaller spacings, for example, 1 inch (2.54 cm), could be accommodated by varying the interval at which the holes 34 are formed in the moveable section 28. It is thought that the 2 inch (5.08 mm) spacing provided for in the preferred embodiment of the present invention will accommodate most users' desired applications.

At a bottom edge 41 of the fixed section 26, a square foot or support plate 42, preferably fabricated of aluminum , is attached to the fixed section 26, preferably by welding. The support plate 42 is used to increase the footprint of the support segment 18, and to distribute the load carried by the support segment 18 to the surface 1 on which the support plate 42 is placed.

At the top edge 35 of the moveable section 28 is a holder 44, also preferably fabricated from aluminum pieces welded in place. The holder 44 includes two confining side plates 46 and a load-bearing plate 48, as shown in FIG. 4. The side plates 46 and the load-bearing plate 48 form a receptacle or cradle 50 in which a rail segment 15 of the rail 14 rests.

Along the vertical sides of the fixed section 26 are attached a number of male coupling tabs 52 each having a hole 54 formed therethrough. The coupling tabs 52 are preferably fabricated from aluminum, and welded to an exterior surface 55 of the fixed section 26 as shown in FIGS. 1–5. The male tabs 52 attached to an upper portion 56 of the fixed section 26 are preferably attached to the fixed section 26 at an offset relative to the tab 52 attached to a lower portion 57 of the fixed section 26. This offset between the upper and lower tabs 52 allows for easier installation and attachment of the trusses 20 to the support segments 18.

As can be seen with reference to FIGS. 1–5, the support segments 18 can be categorized into two classes based on the configuration of the male tabs 52. One class includes the support segments 18 generally represented by the support segments 18a and 18c which are located at the end 17 of the support mechanism, for example. These support segments 18 have tabs 52 on two adjacent sides 55 as shown in FIGS. 2–4. The second class includes the support segments 18 generally represented by support segments 18b and 18d which are located in the middle of the support mechanism. These segments 18 have tabs on three adjacent sides 55, two sets of which are shown in FIGS. 2, 3 and 5, and the third set, not shown, corresponding to the set shown in side view in FIG. 4 for the support segments 18a and 18c.

As previously mentioned, the trusses 20 have two intersecting tubular elements 22, which are joined at their respective midpoints by a tube 58, which is welded into place. At either end 59 of the intersecting tubular elements 22 is attached a female coupling 60, as shown in greater detail in FIG. 6. The female coupling 60 is made of two side plates 62, each of which has a hole 64 formed therethrough, the holes 64 preferably being substantially aligned.

Figure 6:
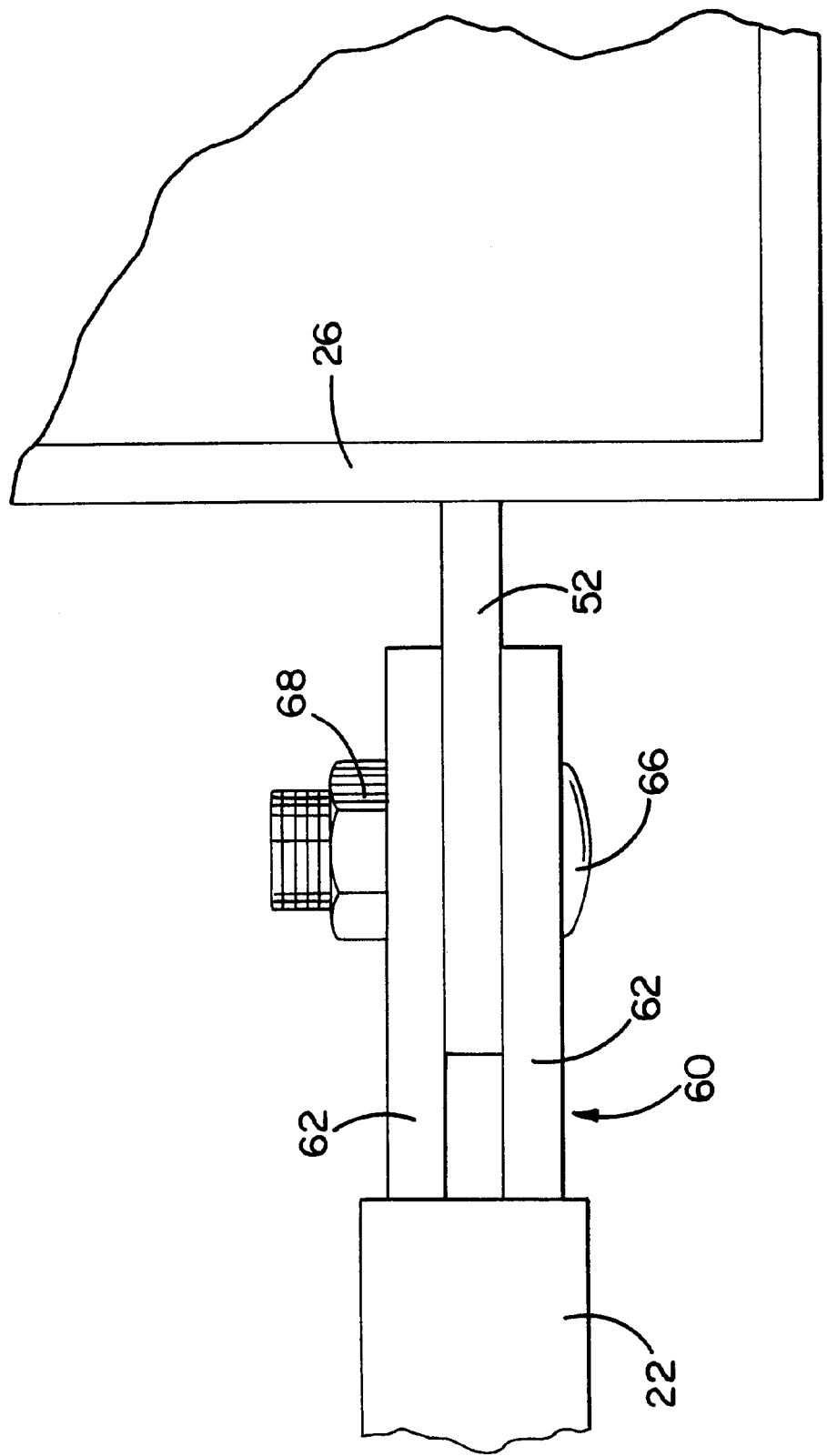
FIG. 6 is an enlarged top view of a locking mechanism used to connect a truss to the support segment.

As further illustrated in FIG. 6, to secure the intersecting tubular elements 22 to the male tabs 52 attached to the fixed sections 26, the holes 64 are substantially aligned with the hole 54. A pin 66, preferably a threaded pin, is then passed through the holes 64 and the hole 54. Preferably, the pin is secured using a nut 68.

Preferably, the trusses 20 are sized to provide a spacing of 72 inches (1.82 m) between the centers of the support segments 18 in the direction shown in FIG. 2 and 3. Given the modular design of the supporting mechanism, a number of trussed support sections 16 can be connected together to span whatever distance is desired, preferably up to a distance of 10 feet (3.05 m). In the direction shown in FIG. 4, the trusses 20 are sized to provide 40 inches (1.02 m) between the centers of the support segments 18.

As shown in FIGS. 2–4, the rails 14 are disposed in the holders 44 provided at the uppermost edge 35 of the moveable sections 28 of the support segments 18. The rails 14 have an I-beam cross-section, as shown in FIG. 4, and have an uppermost support surface 70 with a raised portion or locking rail 72. The rails 14 are preferably fabricated from aluminum, as is the locking rail 72. The locking rail 72 is preferably fabricated from a strip of aluminum angle stock having legs 1 inch (2.54 cm) in length disposed at a 90 degree angle to each other. The ends of these legs are preferably welded to the support surface 70 of the rail 14 to secure the locking rail 72 to the rail 14.

Like the supporting mechanism shown in FIGS. 1–5, the rails 14 are modular and include a plurality of rail segments 15, such as the one shown in detail in FIGS. 2 and 3. The rail segment 15 shown in FIG. 2 is of a first class which has a hole 74 formed through each end 75 of the rail segment 15, and reinforced with a pair of reinforcing plates 76, which have holes 78 passing therethrough. Preferably, the holes 78 are substantially aligned with the hole 74. The rail 14 also has an extension or overhang 80 of the locking rail 72 extending a distance beyond the end 75 of the rail segment 15. This overhang 80 preferably extends for 1 inch (2.54 cm) beyond the end 75 of the rail segment 15.

Figure 7:
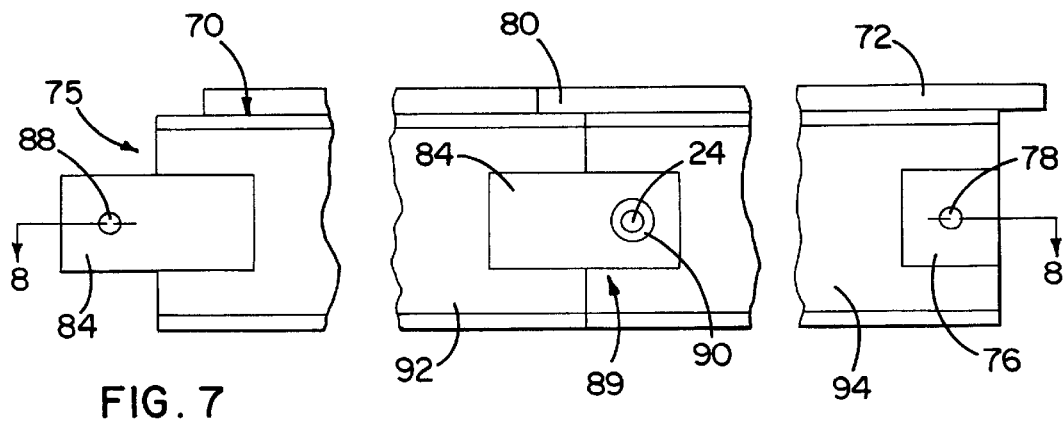
FIG. 7 is an enlarged side view of a locking mechanism used to interconnect rail segments of a guiding mechanism according to the present invention.
Figure 8:
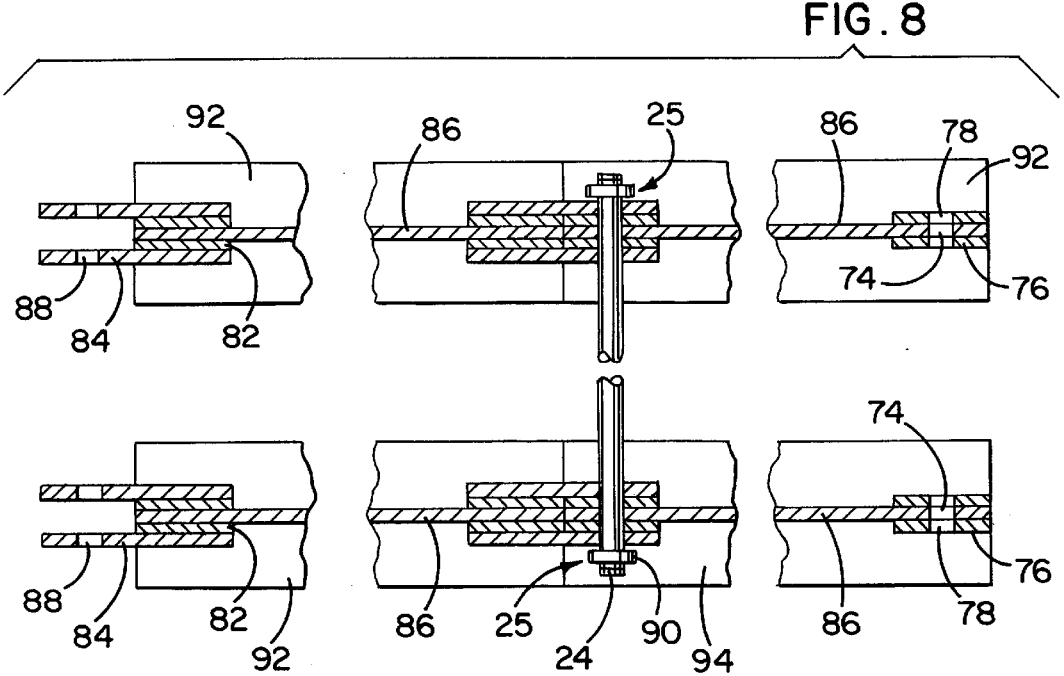
FIG. 8 is an enlarged cross-sectional of the locking mechanism shown in FIG. 6 taken about line 8—8 in FIG. 7.

A second class of rail segments 15 is shown in FIGS. 1, 7 and 8. These rail segments 15 differ from the first class in two ways. Initially, the locking rail 72 does not extend beyond the end 75 of the rail segment 15, but instead is withdrawn from the end 75 of the rail segment 15 the same distance that the locking rail 72 extends beyond the end 75 of the rail segment 15 in the first class. Second, a pair of spacing plates 82 and a pair of extension plates 84 are attached at both ends 75 of the rail segment 15. The spacing plates 82 are attached to the web 86 of the rail segment 15, preferably by welding, while the extension plates 84 are attached to the spacing plates 82, preferably by welding. Each of the extension plates 84 has a hole 88 formed therethrough, and the extension plates 84 are attached to the spacing plates 82 such that the holes 88 of the extension plates 84 are substantially aligned.

A locking mechanism 89 is formed by the holes 74, 78 and 88, an elongate rod 24, as shown in FIGS. 4, 7 and 8 and preferably threaded at both ends 25, and a pair of nuts 90. With the holes 88 of the extension plates 84 of a first rail segment pair 92 substantially aligned with the holes 78 of a second rail segment pair 94, the rod 24 is passed through the extension plates 84 and the rail segments 94 until only the threaded portion 25 of the rod 24 extends beyond the outermost extension plate 84 of each of the rail segments 92. A nut 90 is then secured to the threaded portions 25 of the rod 24 to hold the rod 24 in place, locking the rail segments 92, 94 together.

At the end 17 of the conveyor system, a stop 96 can be attached, as shown in FIGS. 2–4, to the end of one of the rail segments 15. The stop 96 includes a pair of spaced extension plates 98 having holes therethrough, and is attached to the rail segment 15 using the locking mechanism 89 described above.

The cart 10 is preferably disposed on the rails 14, as shown in FIG. 1. However, in the interests of clarity, the cart 10 has been spaced from the rails 14 in FIGS. 2–4 to show the cooperation between the cart 10 and the rails 14.

The cart 10 is preferably fabricated using aluminum materials and welded construction methods. As shown in FIGS. 2–4, the cart has four wheels 12, which are secured to a preferably square carrying plate 104 by four wheel assemblies 106. Although the wheel assemblies 106 are fixedly fastened to the carrying plate 104 in the preferred embodiment of the invention, the wheel assemblies could be rotatably mounted to the carrying plate 104 to allow the cart 10 to move along a predetermined path defined by the rails 14 which is other than a straight path. The cart 10 also has a number of C-shaped channel pieces 108 attached to the lower edge 109 of the carrying plate 104 to provide the carrying plate 104 with added structural rigidity.

The wheels 12 have a running surface 110 in which is formed a groove 112. The groove 112 cooperates with the locking rail 72 on the support surface 70 of the rails 14 to form a locking mechanism 114. The locking mechanism 114 allows the cart 10 to translate along the rails 14 while preventing movement of the cart 10 in a direction transverse to the predetermined path defined by the rails 14. Particularly, the locking rail 72 fits within the groove 112, and thereby prevents the undesirable transverse motion of the cart 10.

In operation, the preferred embodiment described above will preferably arrive as in a broken down state as unassembled pieces at the dock 6 of the warehouse 8 where the transport vehicle 4 to be unloaded is located at a first location 116 some distance from an edge 118 of the dock 6. Particularly, the support segments 18 will arrive preferably disconnected from the trusses 20, and the rail segments 15 and stops 96 will also arrive preferably in a disconnected state. The elongate elements can be stacked in a compact arrangement to facilitate storage and transportation thereof with the conveyor system in the broken down state.

Preferably, the disassembled pieces are color coded to facilitate the assembly of the conveyor system to the assembled state shown herein. That is, the ends 59 of the trusses 20 and the tabs 52 of the support segments 18 may be marked, dyed or painted with a series of colors to assist an assembler in fitting the trusses 20 with the tabs 52 on the support segments 18.

Initially, the support segments 18 will be placed in two lines at spaced intervals, preferably 72 inches (1.83 m) between centers, along a predetermined path which the articles 2 to be unloaded from the transport vehicle 4 are desired to be directed. The spacing between the lines should be approximately 40 inches (1.02 mm) between centers. As many support segments 18 should be used as are necessary to traverse the distance between the transport vehicle 4 and the edge 118 of the dock 6. The trusses 20 are then connected between adjacent support structures 18 in the same line, as between support segments 18*a* and 18*b* in FIG. 2 or support segments 18*c* and 18*d* in FIG. 3, and between adjacent support structures 18 in different lines, such as between support structures 18*a* and 18*c* in FIG. 4.

Specifically, the male tabs 52 attached to the fixed portions 26 of the support segments 18 are passed between the side plates 62 of the female couplings 60 at the ends 59 of the intersecting tubular elements 22. The holes 64 in the side plates 62 of the female couplings 60 are then aligned with the holes 54 in the male tabs 52. The pin 66 is passed through the holes 64 and the holes 54, and is secured using the nut 68.

With the support segments 18 and trusses 20 in place, the rail segments 15 are placed in the holders 44 disposed at the uppermost edges 35 of the moveable sections 28 to define the predetermined path along which the articles 2 from the transport vehicle 4 are desired to be directed. Preferably, the rail segments 15 are cantilevered a substantial distance beyond the end 120 of the trussed support sections 16, extending the predetermined path from the edge 118 of the dock 6 to a second location 122 in the warehouse 8. The rail segments 15 are then secured together using the locking mechanism 89.

Specifically, where the first type of rail segment 92 abuts the second type of rail segment 94, the extension plates 84 of the first type of rail segment 92 are passed about the reinforced end 75 of the second type of rail segment 94. The holes 88 in the extension plates 84 are then aligned with the holes 74 and 78 in the rail segments 94, and the elongate rod 24 is passed through the holes 74, 78 and 88 until only the threaded portion 25 of the rod 24 extends beyond the outermost extension plates 84. Nuts 90 are then attached on either threaded portion 25 of the rod 24 to secure the rail segments 92, 94 in place.

Once the rails 14 have been assembled, the cart 10 is placed on top of the rails 14 so that the running surface 110 is against the uppermost support surface 70 of the rails 14. Additionally, to prevent movement of the cart 10 in the direction transverse to the predetermined path, the wheels 12 of the cart 10 are placed on the rails 14 such that the locking track 72 fits within the groove 112 of the wheels 12.

Preferably, the moveable sections 28 of the support segments 18 are positioned during the assembly of the trussed support sections 16 such that the portion of the rails 14 located adjacent to the transport vehicle 4, i.e. at the end 17, is at a higher elevation relative to the floor of the warehouse 8 or the dock 6 than the portion of the rails 14 disposed on the floor of the warehouse 8 or the dock 6. After this fashion, the cart 10 can move along rails 14 under the force of gravity from the transport vehicle 4 into the warehouse 8.

With the cart 10 on the rails 14 at end 17 adjacent to the transport vehicle 4, articles 2 are removed from the transport vehicle 4 and placed on the carrying plate 104. Alternatively, spacers 124 can be placed between the carrying plate 104 and the article 2 to provide additional clearance for removing the article 2 from the carrying plate 104 once the cart 10 has reached the second location 122 within the warehouse 8. While the article 2 in FIG. 1 is shown with a considerable degree of overhang, it may not be uncommon in practice for 10 or more feet (3.05 m) of the article 2 to overhang the ends of the cart 10.

Once the articles 2 have been placed on the cart 10, the cart 10 is allowed to guidingly translate from the first location 116 to the second location 122 under the force of gravity. In practice, the rails 14 can run up to 100 feet (30.48 m) into the warehouse 8. When the cart 10 arrives at the second location 122, the articles 2 are removed, and the cart 10 is returned to the first location 116 by pushing the cart 10 along the rails 14. The system can be made compact enough to be stored in and transported with the articles 2 in the transportation vehicle 4. Upon completing the transfer of articles 2, the system can be broken down for transportation to another site or to be stored. The system can be made compact enough to be stored in and transported with the articles 2 in the transport vehicle 4.

The inventive conveyor system is not limited to the use for unloading articles 2 from a transport vehicle 4, as previously described. The conveyor system has a more generic application, as shown schematically in FIG. 9, to move articles 2 from one location to the next.

Figure 9:
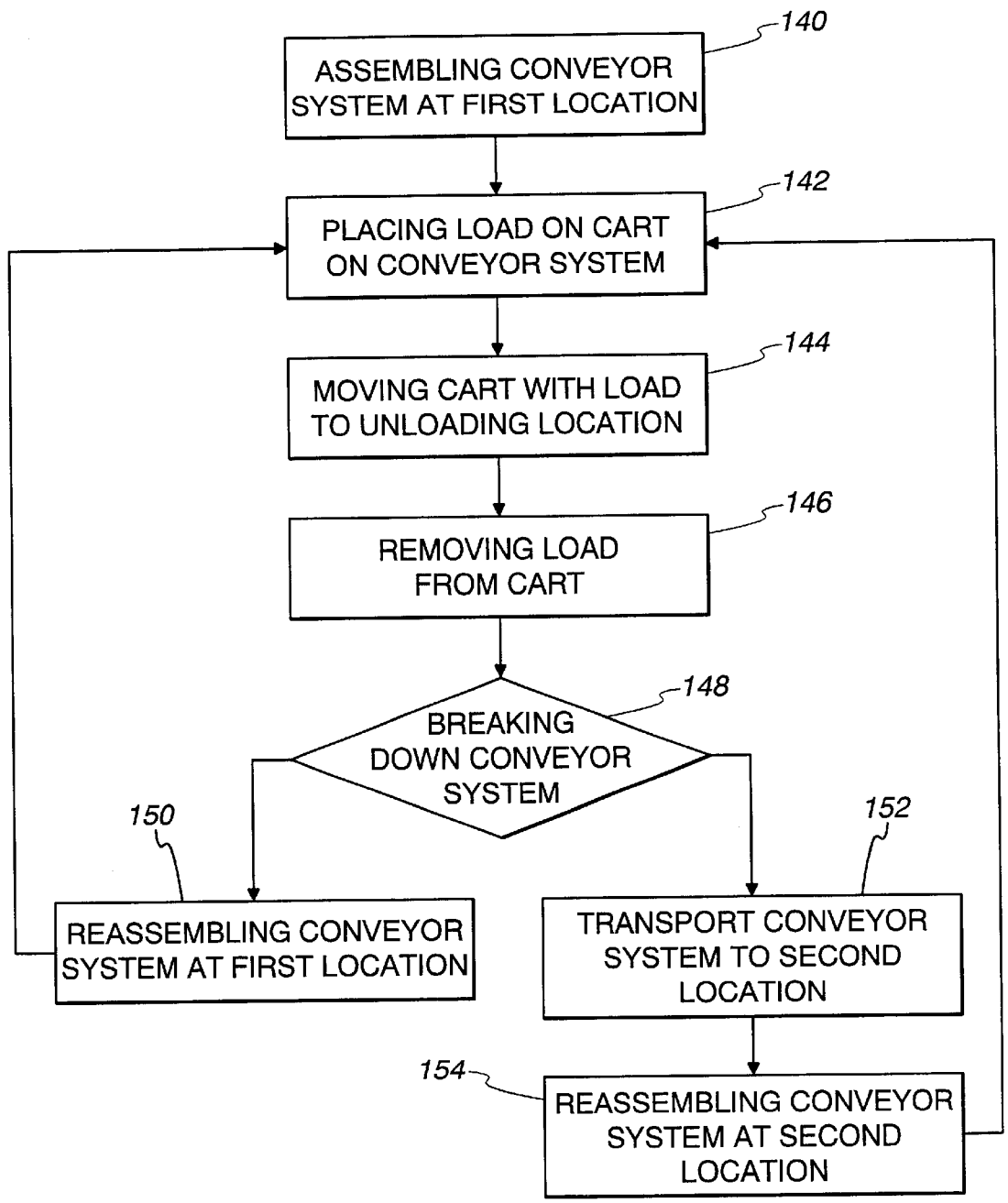
FIG. 9 is a flow diagram generically showing different manners of assembling and using the conveyor system of FIGS. 1–8.

As shown in FIG. 9, the first step of using the conveying system is the assembly of the conveyor system at a desired location, as shown at block 140. Once the conveyor system is assembled, a load is placed on the cart as shown at block 142. The cart with the load thereon is then moved from a loading location to an unloading location, as shown at block 144. At the unloading location, the load is removed from the cart, as shown at block 146. Of course, this process can be repeated for any number of different loads.

Once the unloading process is completed, the conveyor system is broken down, as shown at block 148. Thereafter, the broken down conveyor system can either be reassembled at the same location, as shown at block 150, or transported to another loading/unloading location, as shown at block 152. At a separate location, the conveyor system can be reassembled, as shown at the block 154, for repetition of the process previously described.

Because the conveyor system can be broken down to a relatively compact state, the conveyor system can be moved from one location to the next, as by a small sized pick-up truck, or even a van. Alternatively, in the case that a transport vehicle is to be unloaded, the conveyor system can be kept within the transport vehicle so as to be useable at any number of different locations at which unloading from the transport vehicle is to occur.

Another exemplary operation, which is facilitated using the inventive conveyor system, is shown in FIGS. 10 and 11. In this particular operation, an article 2, having an elongate configuration, is required to be directed through an opening 156 in a wall 158. Through this operation, the article 2 is moved from a region 160 on one side of the wall 158, through the opening 156 to a region 162 on the other side of the wall 158. Because the article 2 has a length L that is greater than the width W of the opening 156, the article 2 cannot be loaded onto a conventional forklift 164 and driven through the opening 156.

Accordingly, the conveyor system is set up so that the rails 14 pass through the wall opening 156 and have a sufficient length to project into both regions 160, 162. The cart 10 is mounted on the rails 14 and situated at a loading location in the region 160, as shown in FIG. 10, such that the article 2 can be placed thereon, as by a forklift 164, or in any other manner, as through an overhead lift or manually. Once loaded, the cart 10 can be advanced guidingly along the rails in the direction of the arrow 166 through the opening 156 into the region 162 where it is accessible to be removed from the cart by the same or a different forklift 164, or otherwise.

It should be understood that the procedure described with respect to FIGS. 10 and 11 is only exemplary as the inventive conveyor system can be temporarily set up to convey articles between any two locations to allow repositioning of a load therebetween.

In FIG. 12, a modified form of conveyor system is shown including a cart 10' which is mounted upon a single guide rail 168 maintained by a support 170 in an elevated position relative to a subjacent support surface 172. The cart 10' has at least one wheel 174 which coacts with the guide rail 168. Spaced, depending flanges 176, 178 cooperates with the guide rail 168 to prevent tipping of the cart 10' with respect to the guide rail 168.

Still other aspects, objects, and advantages of the present invention can be obtained from a study of the specification, the drawings, and the appended claims.

I claim:

1. A method of conveying articles carried by a wheeled, over the road transport vehicle from a first location adjacent to the transport vehicle to a second location spaced from the transport vehicle, the method comprising the steps of:

providing a conveyor system comprising (a) a cart for supporting an article, (b) means for guiding the cart along a predetermined path between the first location and the second location, and (c) means for supporting at least part of the guiding means in an operative position;

assembling the guiding means and the supporting means at a first site with at least a part of the guiding means and supporting means adjacent to and outside of the transport vehicle;

placing the cart on the guiding means;

transferring an article from the transport vehicle directly to the cart on the guiding means;

translating the cart with the article thereon from the first location to the second location along the predetermined path;

removing the article from the cart at the second location;

disassembling the conveyor system; and transporting the disassembled conveyor system to a second site for conveying articles carried by a transport vehicle at the second site.

2. The method according to claim 1, wherein the supporting means further comprises a plurality of upright support segments and a plurality of trusses, and the step of assembling the guiding means and supporting means at the first site comprises the steps of:

placing the support segments at regular intervals along the predetermined path; and connecting the trusses between adjacent support segments.

3. The method according to claim 2, where the step of connecting the trusses between adjacent support segments comprises locking the trusses to the support segments.

4. The method according to claim 3, wherein the support segments have a plurality of tabs thereon, the trusses have a plurality of couplings attached thereto, the tabs and the couplings having holes formed therethrough, and the step of locking the trusses to the support segments comprises the steps of:

aligning the holes in the tabs with the holes in the couplings; and passing a fastener through the holes.

5. The method according to claim 2, wherein the support segments have a variable height in a vertical direction, and the step of assembling the guiding means and supporting means at the first site comprises the step of adjusting the height of the support segments so that there is a decreasing height in a vertical direction of the support segments over a distance at least partially between the first location and the second location.

6. The method according to claim 1, wherein the supporting means further comprises a plurality of support segments and a first and second plurality of trusses, and the step of assembling the guiding means and supporting means at the first site comprises the steps of:

placing the support segments at regular intervals in two lines along the predetermined path;

connecting the first plurality of trusses between adjacent support segments, both adjacent support segments disposed in one of the two lines along the predetermined path; and connecting the second plurality of trusses between adjacent support segments, one of the support segments connected by the second plurality disposed in one of the two lines and the other support segments connected by the second plurality of trusses disposed in the other of the two lines.

7. The method according to claim 1, wherein the guiding means comprises a plurality of rail segments, and the step of assembling the guiding means and supporting means at the first site comprises the steps of:

placing the rail segments at least partially on the supporting means and along the predetermined path; and joining adjacent rail segments.

8. The method according to claim 7, wherein the step of joining adjacent rail segments comprises locking adjacent rail segments using reusable fasteners.

9. The method according to claim 8, wherein the rail segments have first and second ends, a first plurality of rail segments having a hole formed through the first and second ends, a second plurality of rail segments having extension plates attached to the first and second ends, the extension plates extending beyond the first and second ends and having holes formed therethrough, and the step of securely locking adjacent rail segments comprises the steps of:

aligning the holes in the ends of the first plurality of rail segments with the holes in the extension plates formed in the second plurality of rail segments; and placing a fastener through the holes.

10. The method according to claim 1, wherein the step of assembling the guiding means and supporting means at the first site comprises the steps of assembling the supporting means so that the supporting means is freestanding independently of the transport vehicle.

11. The method according to claim 1, further comprising the step of marking at least a part of the supporting means and guiding means different colors to assist in assembling at least part of at least one of the guiding means and the supporting means.

12. The method according to claim 1, further comprising the step of placing visible indications on at least part of the supporting means and guiding means to assist in assembling at least part of at least one of the guiding means and the supporting means on site.

13. The method according to claim 1, further comprising the step of disassembling the supporting means and the guiding means after the article is removed from the cart.

14. The method according to claim 1, further comprising the step of locking the cart to the guiding means to prevent the cart from moving in other than the predetermined path.

15. The method according to claim 14, wherein the cart has a wheel with a running surface and a groove formed in the running surface, the guide means comprises a rail complementary to the groove along the predetermined path, and the step of locking the cart to the guiding means to prevent the cart from moving in other than the predetermined path comprises the step of fitting the rail into the groove in the wheel of the cart.

16. The method according to claim 1 wherein the supporting means is defined substantially entirely by elongate, substantially straight components and the step of assembling comprises the step of assembling the elongate, substantially straight components, each to the other, at the first site.

17. The method according to claim 16 wherein the step of assembling comprises the step of assembling the elongate, substantially straight components using reusable fasteners.

18. The method according to claim 16 wherein the step of assembling comprises the step of assembling the elongate, substantially straight components each to the other using only reusable fasteners to maintain substantially all of the elongate, substantially straight components defining the supporting means in assembled relationship.

19. The method according to claim 1 wherein the guiding means is defined substantially entirely by elongate, substantially straight components and the step of assembling comprises the step of assembling the elongate substantially straight components, each to the other.

20. The method according to claim 1 wherein substantially the entirety of each of the guiding means and supporting means is defined by only elongate, substantially straight components and the step of disassembling the conveyor system comprises the step of disassembling each of the guiding means and supporting means to end up with substantially only separated elongate substantially straight components.

21. A method of conveying an article carried by a wheeled, over the road transport vehicle from a first location at a first site adjacent to the transport vehicle to a second location spaced from the transport vehicle, said method comprising the steps of:

providing a conveyor system comprising a cart for supporting an article, at least one guide rail, and a support for maintaining the at least one guide rail in an operative position, the conveyor system having a broken down state and an assembled state;

placing the conveyor system at the first site in the broken down state;

at the first site, changing the conveyor system from the broken down state into the assembled state wherein the at least one guide rail is on a support and the cart is movably guided along the at least one guide rail between the first and second locations;

with the cart at the first location, loading the article from the transport vehicle directly onto the cart;

moving the cart with the article loaded thereon to the second location;

at the second location removing the article from the cart; and after removing the article from the cart, changing the conveyor system from the assembled state back into the broken down state.

22. The method of conveying an article according to claim 21 further comprising the step of again changing the conveyor system from the broken down state into the assembled state after the article is removed from the cart and the conveyor system is changed from the assembled state into the broken down state.

23. The method of conveying an article according to claim 21 further comprising the steps of moving the conveyor system from the first site to a second site after the article is removed from the cart and the conveyor system is changed from the assembled state into the broken down state and at the second site again changing the conveyor system from the broken down state into the assembled state.

24. The method of conveying an article according to claim 23 further comprising the steps of loading a second article on the cart at a third location with the conveyor system at the second site, with the second article on the cart guidingly moving the cart from the third location to a fourth location, and unloading the second article from the cart at the fourth location.

25. The method of conveying an article according to claim 24 wherein with the conveyor system in the broken down state, the at least one rail and the cart are separated from each other.

26. The method of conveying an article according to claim 25 wherein the conveyor system wherein the support comprises multiple elements which maintain the at least one rail in an elevated position relative to a subjacent support surface with the conveyor system in the assembled state and with the conveyor system in the broken down state the multiple elements of the support are separated from each other and the cart and at least one rail.

27. The method of conveying an article according to claim 24 wherein the at least one rail comprises first and second elongate rails each with a length and spaced from each other in a direction transverse to the length of the first and second elongate rails and the first and second elongate rails are separated from each other and the cart with the conveyor system in the broken down state.

28. The method of conveying an article according to claim 27 wherein the first elongate rail comprises first and second elongate segments and the first and second elongate segments are separated from each other with the conveyor system in the broken down state.

* * * * *